Patented Aug. 1, 1939

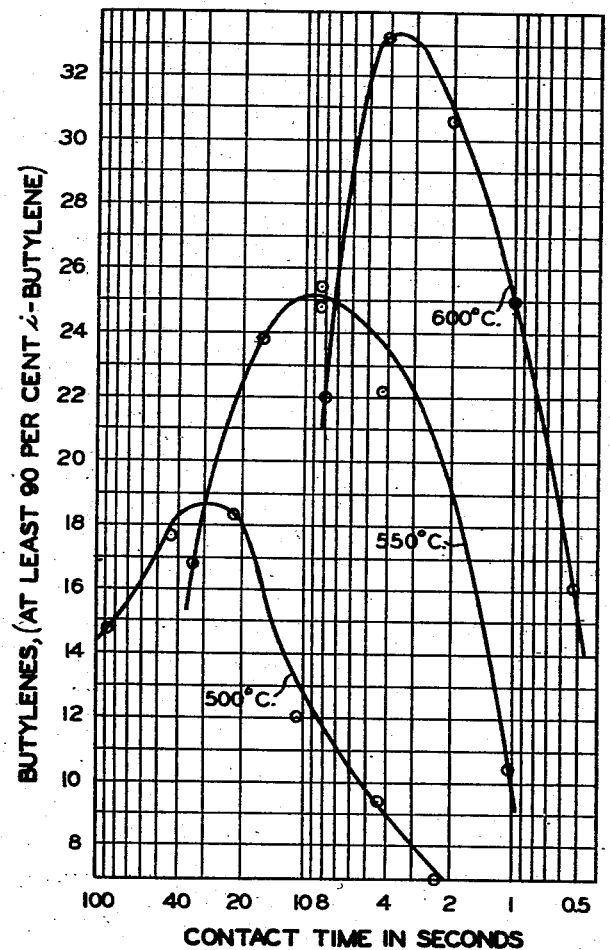

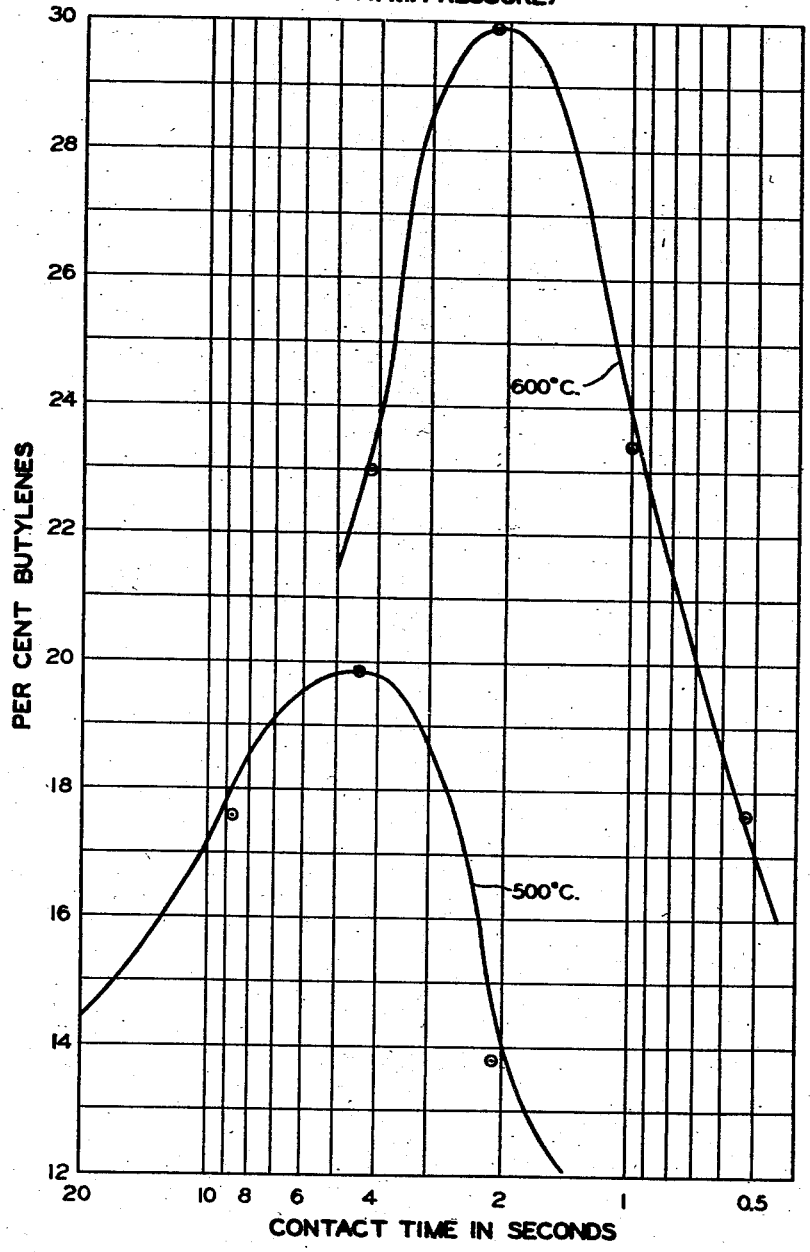

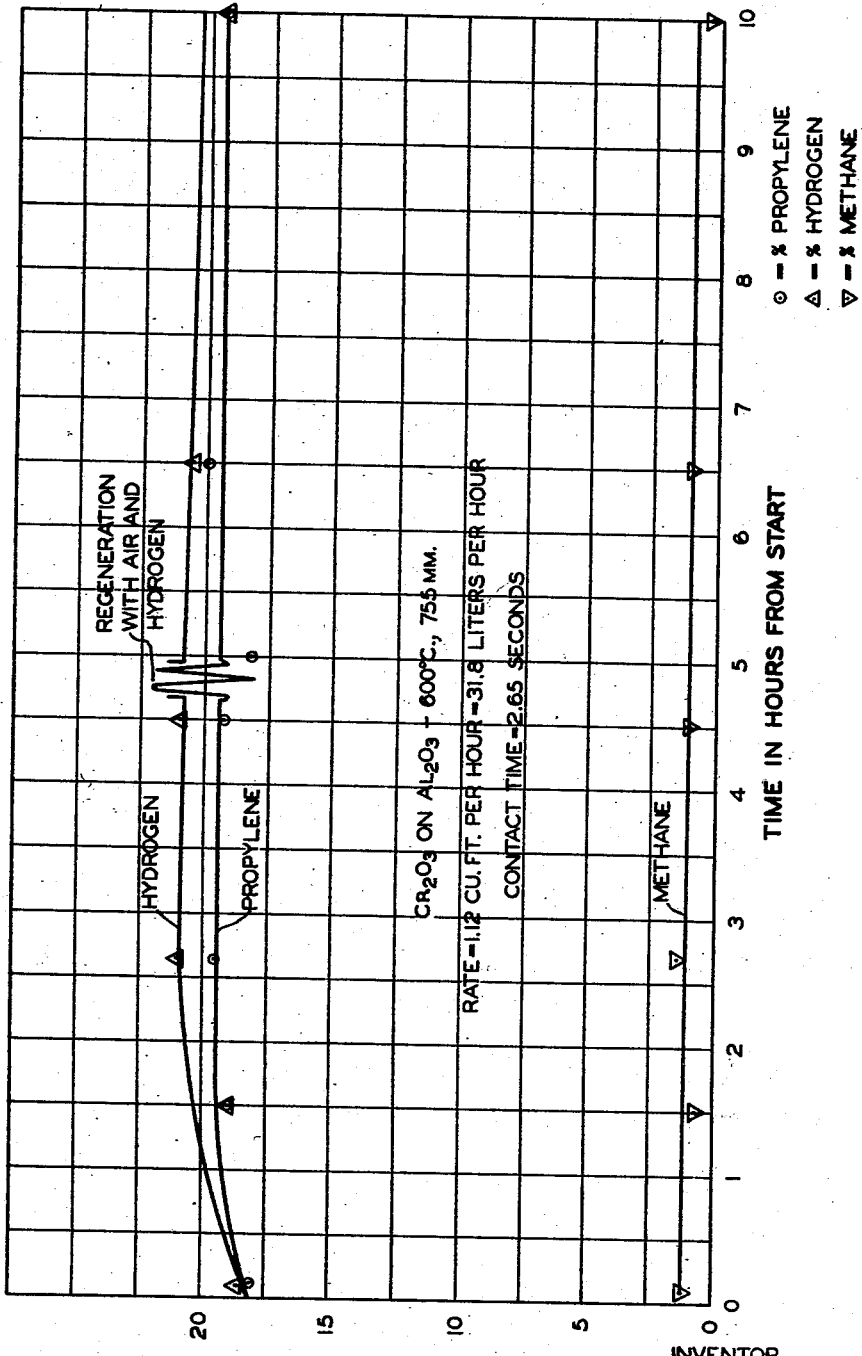

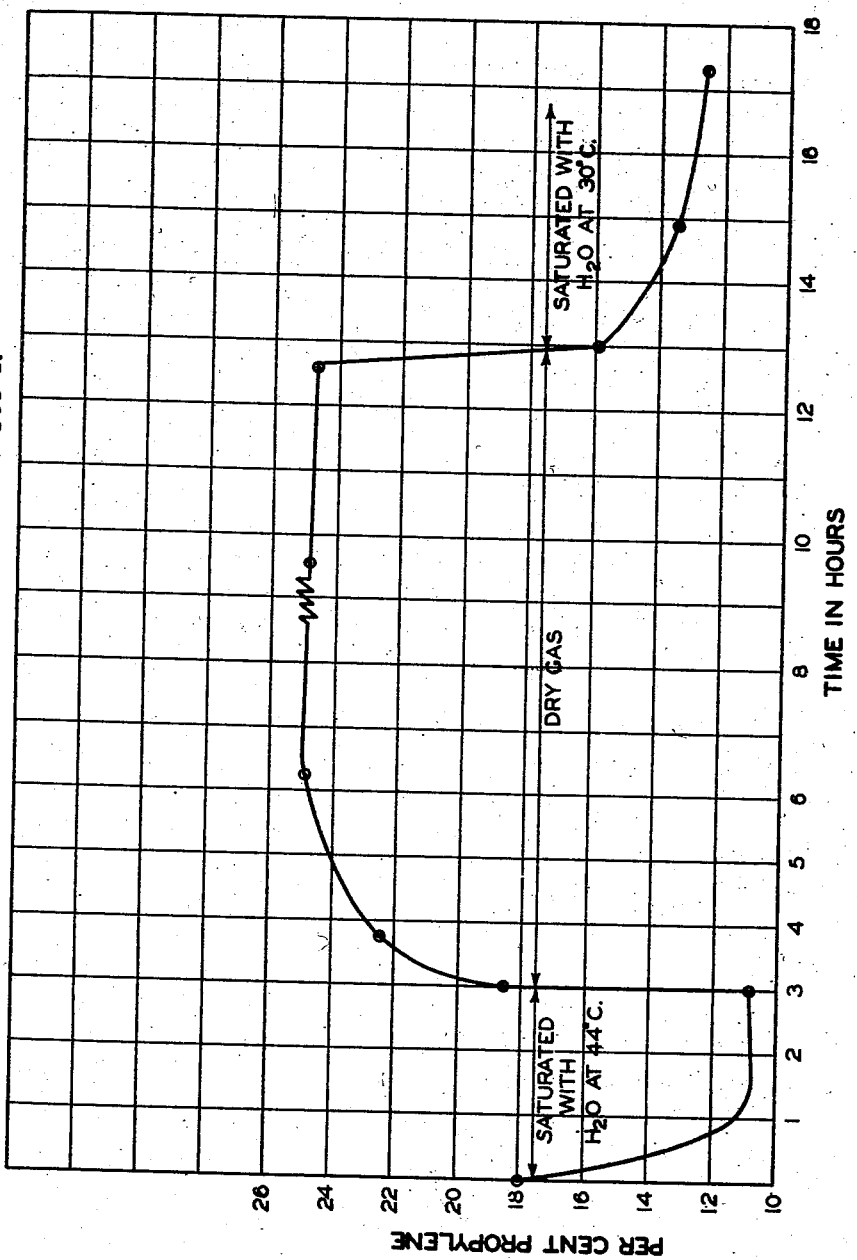

2,167,650

UNITED STATES PATENT OFFICE 2,167,650

TREATMENT OF HYDROCARBON GASES

Aristid V. Grosse, Chicago, Ill., assignor to Universal Oil Products Company, Chicago, Ill., a corporation of Delaware Application November 11, 1935, Serial No. 49,159

2 Claims. (Cl. 260—683)

This invention relates to the treatment of paraffin hydrocarbons which are normally gaseous, including ethane, propane and the butanes.

In a more specific sense, the invention is concerned with a process for converting these low boiling members of the paraffin series of hydrocarbons into their corresponding olefins which contain two atoms of hydrogen less per molecule and consequently have one double bond between carbon atoms.

There is a large commercial production of gaseous paraffin hydrocarbons. They occur in very large quantities in natural gas, particularly those gases associated with the production of crude oil and commonly known as casinghead gases, and this supply is further augmented by the gases produced in cracking oils for the production of gasoline, although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives, on account of the unreactive character of its components in comparison with their olefinic counterparts.

In one specific embodiment, the invention comprises the dehydrogenation of gaseous paraffin hydrocarbons, particularly those containing three and four carbon atoms, at elevated temperatures in the presence of catalysts comprising essentially aluminum oxide supporting minor amounts of chromium sesquioxide.

In the present instance, the catalysts which are preferred for selectively dehydrogenating the lower boiling paraffinic hydrocarbons have been evolved as the result of a large amount of investigation with catalysts having a dehydrogenating action upon various types of hydrocarbons such as are encountered in the fractions produced in the distillation and/or pyrolysis of petroleum and other naturally occurring hydrocarbon oil mixtures. The criterion of an acceptable dehydrogenating catalyst is that it shall split off hydrogen without inducing either scission of the bonds between carbon atoms or carbon separation. In the present invention, catalyst mixtures comprising essentially major amounts of aluminum oxide and minor amounts of chromium sesquioxide are used. While aluminum oxide alone functions to a very limited extent as a dehydrogenating catalyst in the above sense, the tendency to selective splitting off of hydrogen on the one hand has been found to be greatly increased and the tendency to scission of the carbon-to-carbon bond on the other hand has been found to be greatly lessened by the use of the chromium sesquioxide so that the dehydrogenating action is rendered much more definite and effective, the yield of olefinic hydrocarbons is much greater and the life of the catalyst is extended.

An extensive investigation has demonstrated that the catalytic efficiency of alumina is greatly improved by the presence of chromium sesquioxide in minor amounts, usually of the order of less than 10% by weight of the oxide. It is most common practice to utilize catalysts comprising 2 to 5% by weight of this active oxide.

Aluminum oxide to be used as a base material for the manufacture of catalysts for the process may be obtained from natural oxide minerals or ores such as bauxite or carbonates such as dawsonite by proper calcination, or it may be prepared by precipitation of aluminum hydrate from solutions of aluminum sulphate or different alums, the precipitate of aluminum hydroxide being dehydrated by heat, and usually it is desirable and advantageous to further treat it with air or other gases or by other means, for instance, leaching, etc., to activate it prior to use.

Two hydrated oxides of aluminum occur in nature, to wit: bauxite having the formula $Al_2O_3.2H_2O$ and diaspore, $Al_2O_3.H_2O$. In both of these oxides, iron sesquioxide may partially replace the aluminum. These two minerals or corresponding oxides produced from precipitated and suitably activated aluminum hydrate are adaptable for the manufacture of the present type of catalysts and in some instances have given the best results of any of the compounds whose use is at present contemplated. The mineral dawsonite having the formula

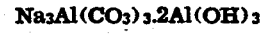

$Na_2Al(CO_3)_3.2Al(OH)_3$ is another mineral which may be used as a course of aluminum oxide. It is of course to be understood that these are merely illustrative of sources of the aluminum oxide catalyst base and that other sources and types may also be available.

In making up catalyst composites of the character and composition which have been found specially well suited for catalyzing dehydrogenation reactions, the following is the simplest and generally the preferred procedure. An aluminum oxide mineral or the precipitated hydroxide is calcined at temperatures of from about 600° C. (1112° F.) to 900° C. (1652° F.) to produce a mixture containing a high percentage of aluminum oxide. The oxide is then ground to produce granules of relatively small mesh and these are caused to absorb compounds which will yield chromium sesquioxide on heating to a proper temperature by stirring them with warm and aqueous solutions of various acids and salts of chromium such as, for example, chromic acid, chromium nitrate, etc. The aluminum oxide resulting from calcination at the temperatures mentioned has a high absorptive capacity for solutions and readily takes up the required amounts of chromium compounds dissolved in aqueous solutions. To insure complete absorption of the chromium solutions and at the same time a uniform distribution upon the aluminum oxide granules, the latter may be added to sufficiently concentrated solutions in such proportions that practically all of the solution is absorbed by the alumina. The chromium solution should be of such quantity and concentration that it will wet the whole mass of alumina granules without leaving any excess solution. The chromium trioxide resulting from the decomposition of the various primarily absorbed compounds such as salts and acids may form some aluminum chromates, but these are decomposed and reduced by the paraffinc gases during the initial periods of service so that the chromium sesquioxide results.

The most readily and conveniently utilizable substances for ultimately adding the requisite amounts of chromium sesquioxide to alumina are chromium nitrate Cr(NO₃)₃ and chromic acid H₂CrO₄, the latter being essentially a solution of chromium trioxide in water. The primary decomposition of these compounds after drying in the presence of air results in the deposition of the trioxide, which immediately combines with the alumina to form aluminum chromate and this is decomposed to form aluminum and the chromium sesquioxide during a preliminary heating period. Ammonium chromate may also give similar results. The use of chromium nitrate is preferred for economic reasons. It is to be emphasized that in a sense the chromium sesquioxide is the essential catalyst preferred for accomplishing the objects of the present invention, even though it may be a minor constituent of the total catalyst composites.

In practicing the dehydrogenation of paraffinic gases according to the present process, a solid composite catalyst prepared according to the foregoing briefly outlined methods is used as a filler in a reaction tube or chamber in the form of particles of graded size or small pellets, and the gas to be dehydrogenated is passed through the catalyst after being heated to the proper temperature, usually within the range of from about 400° to 770° C. (752° to 1400° F.). The most commonly used temperatures, however, are around 500° C. to 600° C. (932 to 1112° F.). The catalyst tube is heated exteriorly to maintain the proper reaction temperature. The pressure employed may be subatmospheric, atmospheric or slightly superatmospheric of the order of from 50 to 100 pounds per square inch. While pressures up to 500 pounds per square inch may be employed in some cases, pressures of the order of atmospheric or below are generally preferred. The time during which the gases are exposed to dehydrogenating conditions in the presence of the preferred catalyst is comparatively short, usually below twenty seconds, and preferably as low as from 0.5 to six seconds.

It is an important feature of the present process that the gases to be dehydrogenated should be free from all but traces of water vapor since the presence of any substantial amounts of steam reduces the catalytic effectiveness of the composite catalyst to a marked degree. In view of the empirical state of the catalytic art, it is not intended to submit a complete explanation of the reasons for the deleterious influence of water vapor in the present type of catalyzed reactions, but it may be suggested that the action of the steam is to cause a partial hydration of the alumina and the chromium oxide due to preferential adsorption, so that in effect the paraffin gases are prevented from reaching or being adsorbed by the catalytically active surface.

The exit gases from the catalytic tube or chamber may be passed through selective absorbents to combine with or absorb the olefin or olefin mixture produced, or the olefins may be selectively polymerized by suitable catalysts, caused to alkylate other hydrocarbons such as aromatics or paraffins or treated directly with chemical reagents to produce desirable and commercially valuable derivatives. After the olefins have been removed, the residual gases may be recycled for further dehydrogenating treatment with or without removal of hydrogen.

The present types of catalysts are selective in removing two hydrogen atoms from a paraffin molecule to produce the corresponding olefin without furthering to any great degree undesirable side reactions, and because of this show an unusually high conversion of paraffins into olefins, as will be shown in later examples. When, the activity of these catalysts begins to diminish, it is readily regenerated by the simple expedient of oxidizing with air or other oxidizing gas at a moderately elevated temperature, usually within the range employed in the dehydrogenating reactions. This oxidation effectively removes traces or carbon deposits which contaminate the surface of the particles and decrease their efficiency. It is characteristic of the present types of catalysts that they may be repeatedly regenerated without substantial loss of catalytic efficiency.

During oxidation with air or other oxidizing gas mixture in regenerating partly spent material, there is evidence to indicate that the oxide Cr₂O₃ is to a large extent, if not completely oxidized to CrO₃ which combines with the alumina to form an aluminum chromate. Later this chromate is decomposed by contact with reducing gases in the first stages of service to reform the green sesquioxide and regenerate the real catalyst and hence the catalytic activity.

Numerous experimental data could be adduced to indicate the results obtainable by employing the present type of catalyst to dehydrogenate paraffins, but the following examples are sufficiently characteristic.

*Example I*

In making up the catalyst for the catalytic dehydrogenating operation, 100 parts by weight of 6 to 10 mesh activated alumina particles were added to 50 parts by weight of a 10% solution of chromium trioxide in water at room temperature. After stirring for a few moments, the small amount of supernatant liquid was decanted and the particles were dried first at a temperature of 100° C. and then at approximately 220–230° C. By this procedure, the major portion of the dissolved chromium trioxide was absorbed by the alumina particles.

Using the granular catalyst particles prepared as above described, isobutane was passed through a treating tower containing them as filler at atmospheric pressure and temperatures of from about 500–600° C. (932–1112° F.), with a space velocity of from 500 to 800 per hour. At the temperatures employed the trioxide was completely converted to the chromium sesquioxide. The curves shown in Fig. 1 indicate graphically using semilogarithmic coordinates the results obtained in these experiments. The exit gas at 600° C. and about 4 seconds time of contact consisted of about 33% butylenes, 33% undecomposed i-butane and 33% hydrogen. Thus substantially 50% of the original isobutane was converted into butylenes and hydrogen.

Example II

In this case a mixture of n-butanes was dehydrogenated with a catalyst prepared as in Example I. The results of experiments conducted at 500 and 600° C. respectively are again shown graphically in Fig. 2. From the curves it is seen that at a temperature of 600° C., atmospheric pressure and contact time of 2 seconds it was found possible to convert 42% of the butanes into a mixture of butylenes in a once-through operation, which is calculated by utilizing the expansion factor and the percentage of butylenes shown.

The runs were continued for a period of 450 hours with intermittent regenerating periods in which air was passed over the catalyst for 10–15 minutes followed by the passage of hydrogen for an approximately 1–2 minute period. The regenerating step was practiced at intervals of from 10–24 hours. At the end of this time there was only a slight diminution in the activity of the catalyst.

Example III

In making up the catalyst for this example, 250 parts by weight of activated alumina consisting of 10 to 12 mesh particles were mixed with a solution of 50 grams of chromic nitrate dissolved in 100 parts by weight of water. After the mixing with the granules they were dried first at 100° C. for 2 hours and then heated to 200–250° C. for 12 hours to decompose the nitrate and then further heated to 400–500° C. in the catalyst tube to produce the final catalyst. An analysis of the catalyst indicated the following composition:

| | Per cent |
|---|---|
| $Al_2O_3$ | 96 |
| $Cr_2O_3$ | 4 |
| Water | 0.1 |

Pure propane was passed over this catalyst at atmospheric pressure and 600° C. (1112° F.) with contact times of 1 to 2 seconds, the composition of the exit gases obtained during a run being shown graphically in Fig. 3. The exit gas had the following average composition:

| | Per cent |
|---|---|
| Propylene | 25 |
| Hydrogen | 26 |
| Methane | 0.5 |
| Propane | 48 |
| Ethylene | 0.2 |

This gas composition was substantially unchanged after the successive regenerations.

To show the effect of the presence of water, substantially dry propane and propane containing approximately 10% by volume of steam were passed over the catalyst in successive periods at 600° C., and atmospheric pressure, allowing a contact time of about 2 seconds. The dry propane was made by passing the gas as received through granular calcium chloride. The general results of the experiments utilizing dry and wet propane are indicated graphically in Fig. 4. In the first 3 hours of a run the percentage propylene dropped sharply from 18% to slightly below 11% and remained at this point. When the gas was dried, the percentage of propylene rose rapidly until at the end of 6 hours it reached a value of 25%. After about 10 hours of operation the propane was again saturated with water vapor at 30° C. and the percentage of propylene in the exit gas again dropped though not to as low a figure as in the case of the fresh catalysts, probably because there was less water in the gas saturated at 30° C. than that saturated at 44° C. in the first period of the run.

The character of the present invention and its practical applications are sufficiently developed and exemplified by the foregoing specification and limited examples. However, neither section is to be construed as unduly limiting upon the proper scope of the invention.

I claim as my invention:

1. A process for converting normally gaseous paraffins into their corresponding olefins which comprises subjecting the paraffins, at from about 400° to 770° C. and for a contact time of from about 0.5 to 6 seconds, to the action of an aluminum oxide catalyst supporting between approximately 2% and 10% by weight of chromium sesquioxide.

2. A process for converting butanes into butylenes which comprises subjecting the butanes, at from about 500° to 600° C. and for a contact time of from about 0.5 to 6 seconds, to the action of an aluminum oxide catalyst supporting between approximately 2% and 10% by weight of chromium sesquioxide.

ARISTID V. GROSSE.